United States Patent [19]

Lange et al.

[11] Patent Number: 4,457,958
[45] Date of Patent: Jul. 3, 1984

[54] METHOD OF STRENGTHENING SILICON NITRIDE CERAMICS

[75] Inventors: Frederick F. Lange, Thousand Oaks; David R. Clarke, Newbury Park, both of Calif.

[73] Assignee: Rockwell International Corporation, El Segundo, Calif.

[21] Appl. No.: 266,244

[22] Filed: May 22, 1981

Related U.S. Application Data

[63] Continuation-in-part of Ser. No. 146,944, May 2, 1980, abandoned.

[51] Int. Cl.³ .............................................. B05D 3/02
[52] U.S. Cl. ....................................... 427/314; 264/62; 427/193; 427/355; 427/399
[58] Field of Search .................. 427/85, 93, 180, 193, 427/248.1, 255, 289, 443.2, 430.1, 397.7, 376.2, 376.4, 444, 314, 355, 399, 356; 106/73.2; 264/62

[56] References Cited

U.S. PATENT DOCUMENTS

| Re. 28,385 | 4/1975 | Mayer | 427/93 |
|---|---|---|---|
| 3,411,930 | 11/1968 | Reising | 427/289 |
| 3,811,928 | 5/1974 | Henney et al. | 427/399 |
| 3,983,198 | 9/1976 | Mangels | 427/399 |
| 4,046,580 | 9/1977 | Ishii et al. | 106/73.2 |
| 4,099,979 | 7/1978 | Lange et al. | 106/73.5 |
| 4,102,698 | 7/1978 | Lange et al. | 106/73.5 |
| 4,104,442 | 8/1978 | Sussmuth | 427/93 |
| 4,179,486 | 12/1979 | Lange | 106/73.2 |

FOREIGN PATENT DOCUMENTS 2722904 12/1977 Fed. Rep. of Germany ...... 427/289

Primary Examiner—Sadie L. Childs
Attorney, Agent, or Firm—H. Fredrick Hamann; Craig O. Malin

[57] ABSTRACT

$Si_3N_4$ ceramics having a glassy phase densification aid are heated while their surface is in contact with $SiO_2$. The $SiO_2$ forms one side of a diffusion couple and draws the glassy phase out of the ceramic. The $SiO_2$ can be provided by heating the ceramic in air to form an $SiO_2$ scale by the oxidation of $Si_3N_4$, or by imbedding the ceramic in $SiO_2$ powder. Surface pits, if any, formed during oxidation, are removed by grinding.

14 Claims, 3 Drawing Figures

METHOD OF STRENGTHENING SILICON NITRIDE CERAMICS

STATEMENT OF GOVERNMENT INTEREST

The invention described herein was made in the course of, or under a contract with the Air Force Office of Scientific Research.

CROSS REFERENCE TO RELATED APPLICATION

This application is a continuation-in-part of application Ser. No. 146,944, filed May 2, 1980, which is abandoned.

BACKGROUND OF THE INVENTION

This invention relates to the field of ceramics and particularly to the field of silicon nitride ($Si_3N_4$) ceramics.

DESCRIPTION OF THE PRIOR ART

During the last decade, $Si_3N_4$ ceramics have received considerable attention primarily directed toward heat engine applications. Their intrinsic properties such as low thermal expansion and moderate elastic modulus minimize stresses developed during severe thermal transients better than other candidate structural ceramics. In practice, the chemical formula $Si_3N_4$ represents a family of ceramic materials in which $Si_3N_4$ constitutes the major phase.

$Si_3N_4$ ceramics are prepared by mixing $Si_3N_4$ powder with additive powders, and densifying the mixture by either hot-pressing or pressureless sintering. Hot pressing is usually carried out in graphite dies at temperatures between 1650° C. and 1750° C. for several hours under high pressures. Pressureless sintering is accomplished by forming the mixed powders into shapes before densification. These shaped, powdered parts are then sintered by heating them at the sintering temperature.

$Si_3N_4$ powder oxidizes when heated to high temperatures in air, and such oxidation is undesireable because it changes the composition of the powder, i.e., increases the $SiO_2$ content. Therefore, special precautions are taken during the processing and sintering of $Si_3N_4$ ceramic to prevent it from oxidizing. Such precautions include providing a protective atmosphere such as a nitrogen atmosphere, or packing the ceramic in a protective $Si_3N_4$ powder as described in U.S. Pat. No. 4,179,486 to Frederick F. Lange (one of the present inventors).

Additives, called densification aids, are required for densification, and these densification aids are mixed with $Si_3N_4$ powder. Current commercial, hot-pressed materials are fabricated using MgO as a densification aid. Other known densification aids include $ZrO_2$, $Al_2O_3$, BeO, and rare earth oxides such as $Y_2O_3$, $CeO_2$, $Ce_2O_3$, $Nd_2O_3$, and $La_2O_3$.

The densification aids react with $Si_3N_4$ and $SiO_2$ at high temperatures to form a liquid, which upon cooling results in a glassy phase located between the primary phase of crystalline $Si_3N_4$ grains so that the material is a dense, polyphase ceramic. Unfortunately, this glassy phase becomes viscous at high temperatures and causes the mechanical properties to degrade at high temperature. The temperature at which degradation begins depends on the composition of the glassy phase. The extent of degradation depends on the volume fraction of the glassy phase. Within a given system, compositions containing a smaller volume fraction of glassy phase have significantly higher strength and creep resistance at high temperature. However, compositions containing little or no glassy phase are difficult or impossible to densify.

SUMMARY OF THE INVENTION

It is an object of the invention to provide an improved $Si_3N_4$ ceramic.

It is an object of the invention to provide a method of increasing the higher temperature strength of $Si_3N_4$ ceramics.

It is an objective of the invention to provide a method of fabricating a $Si_3N_4$ ceramic utilizing a densification aid to obtain rapid densification and still obtain a high strength $Si_3N_4$ ceramic.

It is an object of the invention to provide a method of reducing the amount of glassy phase in $Si_3N_4$ ceramics.

It is an objective of the invention to provide a method of increasing the oxidation resistance of $Si_3N_4$ ceramics.

According to the invention, silicon dioxide ($SiO_2$) is provided on the surface of a $Si_3N_4$ ceramic which has a glassy secondary phase located between grains and/or at grain triple junctions of the primary phase of crystalline $Si_3N_4$. The $SiO_2$ can be provided by immersing the $Si_3N_4$ alloy in powdered $SiO_2$, or by heating the $Si_3N_4$ alloy in air to oxidize the $Si_3N_4$ and form a thin scale of $SiO_2$.

The $Si_3N_4$ ceramic and the $SiO_2$ are then heated to a temperature which is sufficient to cause diffusion of cations from the silicates in the glassy phase into the $SiO_2$ scale or $SiO_2$ powder on the surface of the ceramic. This cation diffusion takes place because the $SiO_2$ on the surface forms a diffusion or reaction couple with the silicate glassy phase inside the ceramic. This outward cation diffusion and the inward diffusion of oxygen has been discovered to result in a change of both the chemistry and phase content of the bulk material. Any surface pits formed during the heating are removed by grinding.

High strength $Si_3N_4$ ceramics can be fabricated using sufficient quantities of densification aids to promote rapid densification during sintering despite the fact that the densification aids are known to decrease the high temperature strength of the ceramic. Then the high temperature strength of the ceramic can be improved by the oxidation-induced compositional changes procedures of the invention. This is possible because the compositional changes decrease the volume fraction of glassy phase.

DESCRIPTION OF THE PREFERRED EMBODIMENT

Silicon nitride based ceramics are inherently unstable in oxidizing atmosphere, and since they are polyphase materials, their oxidation behavior is quite complex. Current commercial ceramics have a primary phase of $Si_3N_4$ grains and a glassy secondary phase used to densify the alloy. In the case of ceramics which use MgO as a densification aid (generally referred to a composition in the Si-Mg-O-N system), the glassy phase has a eutectic composition (in mole fraction) of approximately 0.1 $Si_3N_4$, 0.3 $Si_2N_2O$, and 0.6 $Mg_2SiO_4$. The glassy phase also contains small amounts of cation impurities such as Ca, Fe, Al, Mn, Na, and K. The glassy secondary phase is principally a continuous intergranular phase.

The oxidation of $Si_3N_4$ ceramics was investigated in work leading to the present invention. A variety of ceramics throughout the $Si_3N_4$-$SiO_2$-MgO system were investigated. These included two series containing 0.833 and 0.755 mole fraction of $Si_3N_4$. The materials were prepared by hot-pressing composite powders of $Si_3N_4$, MgO, and $SiO_2$ as known in the art. Specimens for oxidation were cut from each material and the constituent phases were identified by x-ray diffraction analysis. Specimens were then oxidized in air at 1400° C. in an open-ended furnace for 24 and 288 hours.

After oxidation, the specimens were cut in half. One half was used to determine the compositional gradient from the exterior to the interior. The procedure was to successively grind the surface and determine the surface phase with x-ray diffraction until the center of the specimen was reached. The other half was used for a non-dispersive x-ray microanalysis determination of the spatial distribution of elements from the oxidized surface to the interior. Samples having the same compsitions, but unoxidized, were sectioned and analyzed to provide calibrations for the x-ray microanalyses.

When the oxidized specimens were sectioned and polished, three distinct regions could be discerned in all the materials: a friable, white oxide scale, a sub-scale reaction zone beneath the scale and a central portion. For each specimen, it was found that the scale was greatly enriched in Mg and Ca relative to the unoxidized samples. There was no detectable enrichment or depletion of silicon in the material beneath the scale. In each of the specimens there was, however, a magnesium depletion in the subscale material, the extent of which was a function of the $MgO/SiO_2$ ratio of the starting composition. In the unoxidized samples, the Mg/Si ratio was independent of position, indicating that during oxidation, Mg had diffused to the scale from as far as the center of the specimens.

Figure 1:
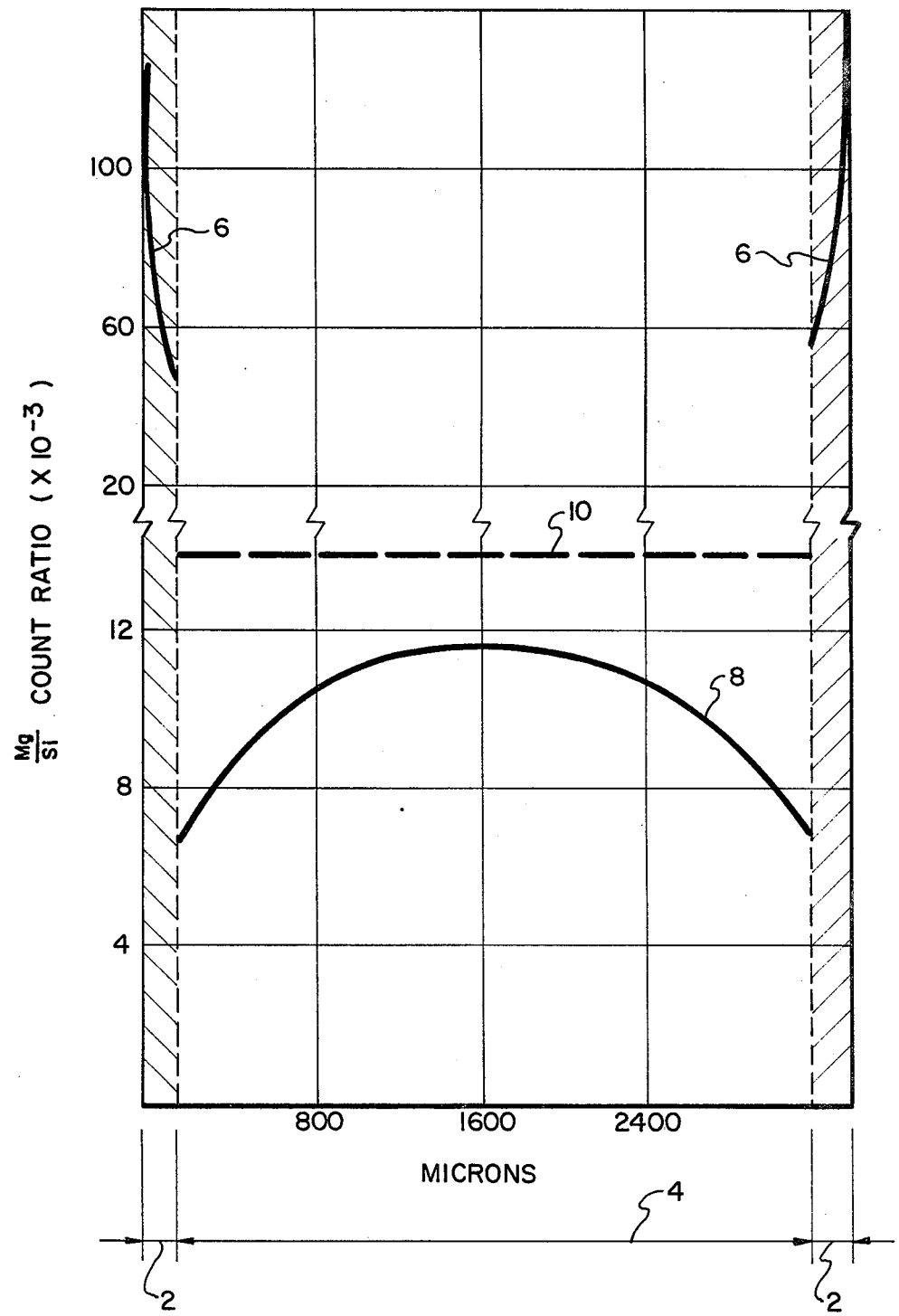
FIG. 1 is a curve showing the distribution of Mg across the thickness (both scale and subscale) of an oxidized sample of an $Si_3N_4$-$SiO_2$-MgO ceramic.

FIG. 1 shows the distribution of Mg in the scale 2 and in the sub-scale 4 based upon the Mg/Si ratios measured by x-ray microanalysis of a specimen having 0.755 mole fraction of $Si_3N_4$ which was oxidized for 288 hours at 1400° C. The specimen was 3360 microns thick and had developed a scale 180 microns thick on both exposed sides. The Mg/Si ratio in the sub-scale is shown in lower curve 8. THe ratio prior to oxidation is shown by dashed line 10. Since Mg is depleted in the immediate region below the scale, it appears that Mg is drawn into the scale faster than it diffuses from the interior into the scale.

Figure 2:
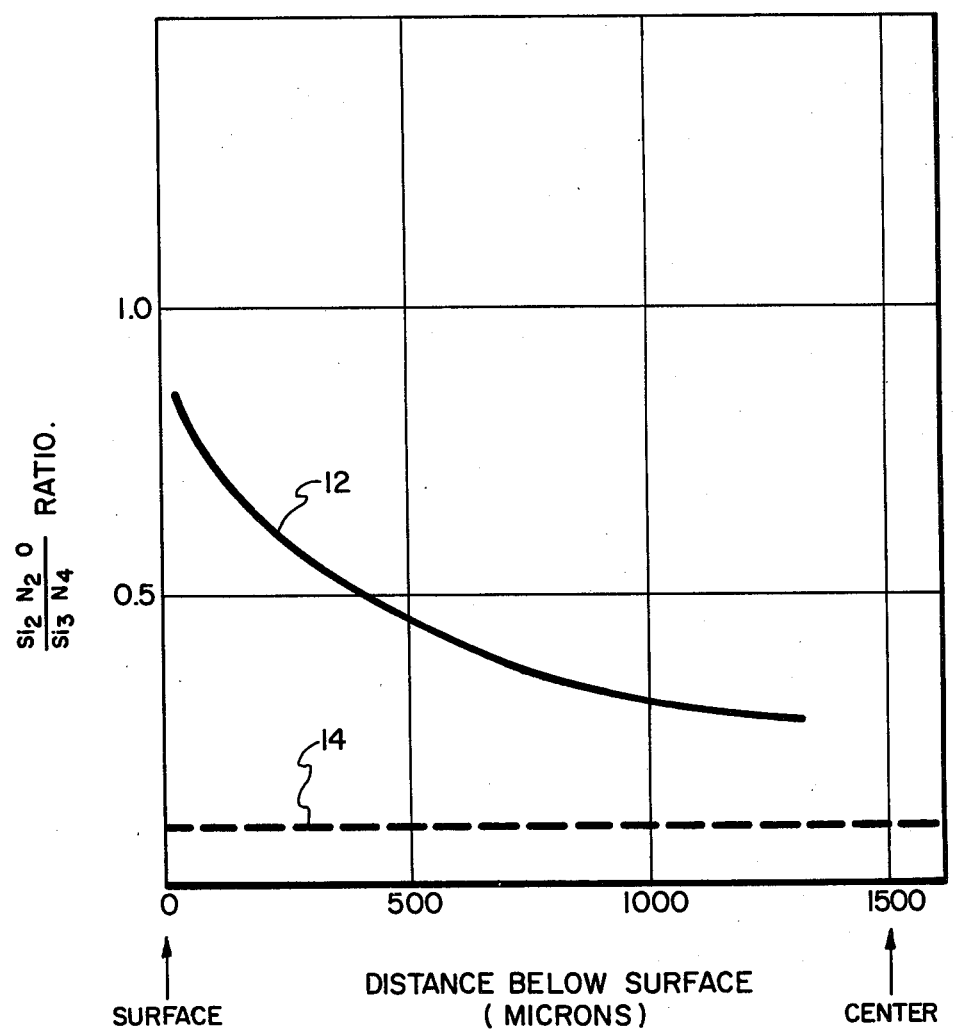
FIG. 2 is a curve showing the oxidation of a $Si_3N_4$-$SiO_2$-MgO ceramic from its surface below the scale to its center plotted as a function of $Si_2N_2O/Si_3N_4$ ratio vs distance below the surface.

Compositional changes within the sub-scale material were discovered after measuring the $Si_2N_2O/Si_3N_4$ ratio from the surface of the sub-scale material (just under the scale) to the center of the specimen as shown by curve 12 in FIG. 2. Dashed line 14 shows the $Si_2N_2O/Si_3N_4$ ratio of the sample before oxidation. The decrease in Mg and the increase in $Si_2N_2O$ shown in FIGS. 1 and 2 indicate that the glassy phase in the specimen has been reduced by the oxidation treatment, particularly near its surface.

The diffusion of Mg and cation impurities to the surface during oxidation is apparently caused by the formation of a reaction couple between the $SiO_2$ scale on the oxidized surface and the Mg containing glassy phase in the bulk of the material. This diffusion produces a compositional gradient and, thus, must produce a depletion gradient of the glassy phase. Since the composition at the scale/sub-scale interface has shifted furthest from the eutectic (or glass) composition, rules for interpreting phase diagrams indicate that the volume fraction of the glassy phase will be smallest at this interface. In terms of an equivalent phase diagram, the composition of the glassy phase is nearly identical to the eutectic composition and the composition in the subscale material has shifted away from the eutectic composition as a result of the compositional changes produced by diffusion.

The $SiO_2$ on the surface which forms one side of the diffusion couple and draws out the detrimental glassy phase can be provided simply by heating the specimen in air or oxygen as described above. This creates an $SiO_2$ scale on the oxidized surface as a result of the reaction of oxygen with $Si_3N_4$. In a second embodiment of the invention, the $SiO_2$ is provided by surrounding the $Si_3N_4$ ceramic with $SiO_2$ powder during a high temperature heat treatment. Cations (other than Si) which form the glassy phase will diffuse to the $SiO_2$ powder on the surface in an attempt to reach equilibrium.

The post-fabrication treatment methods of the invention will improve the high temperature stability of dense $Si_3N_4$ ceramics. Oxidation resistance is improved due to the decreased flux of anions (oxygen, nitrogen) and cations (additive and impurities) as the volume fraction of the glassy (or viscous) phase, which is the path for fast diffusion, is decreased by the post-fabrication treatment.

It has also been discovered that oxidation as described above increases the high temperature creep resistance and strength of $Si_3N_4$ ceramics. This is an important discovery because it makes $Si_3N_4$ ceramics more useful in structural applications. The strength increase is quite substantial, as shown by the following examples:

EXAMPLE I: Increased Creep Resistance

Specimens (approximately 0.3×0.3×0.9 cm) were diamond cut from a ceramic of 0.75 mole fraction $Si_3N_4$, balance MgO and $SiO_2$, with a molar ratio of $MgO/SiO_2$ of 0.09. Some of the specimens were oxidized in an air furnace at 1400° C. for 100 hours. This created an oxide surface scale which was less than 50 $\mu$m thick.

Figure 3:
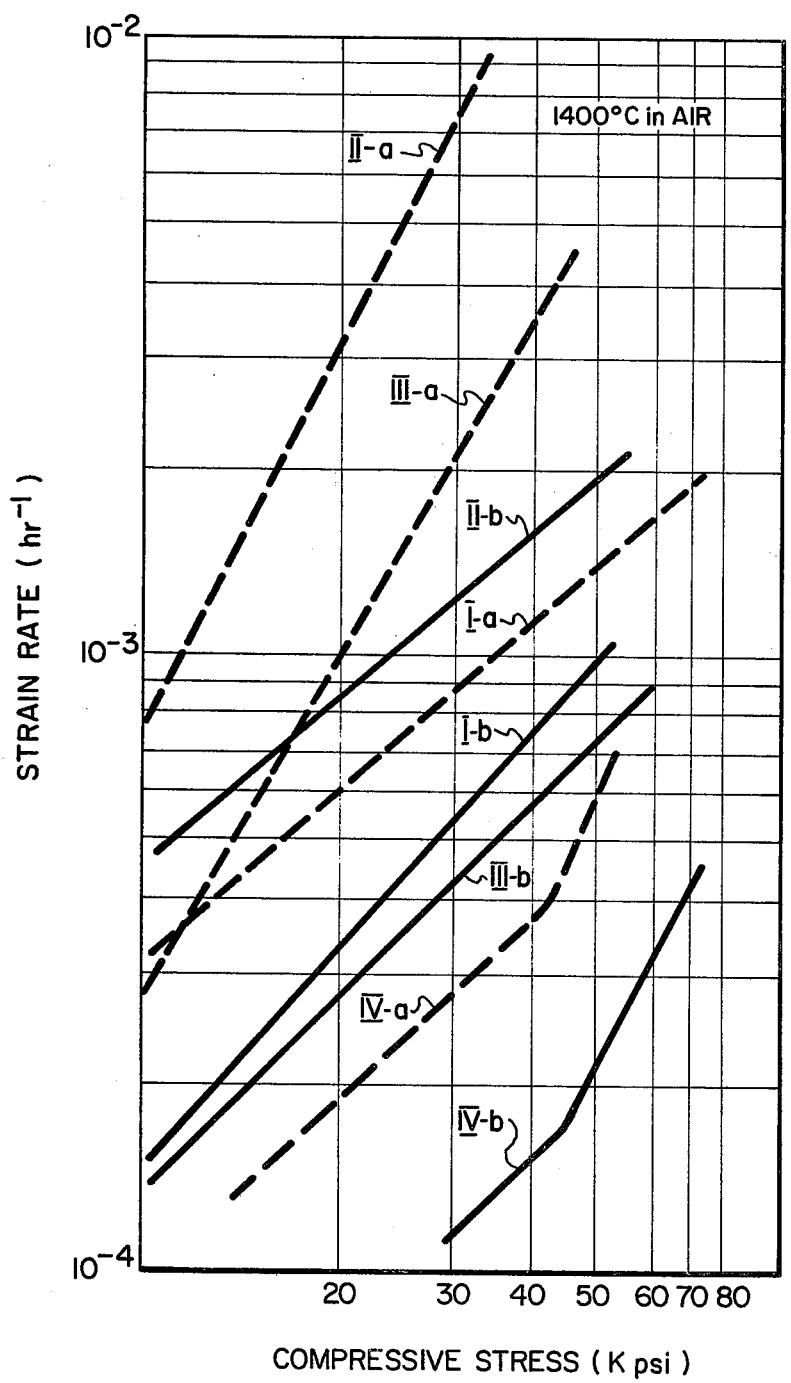
FIG. 3 is a log-log plot of the strain rate vs compressive stress at 1400° C. for unoxidized and oxidized samples of $Si_3N_4$ ceramics.

Compressive creep testing was performed at 1400° C. in air on the unoxidized and on the oxidized specimens. Log-log plots of this data are shown in FIG. 3, dashed curve I-a being for the unoxidized specimen and solid curve I-b being for the oxidized specimen. As shown, the oxidation treatment greatly improved the compressive creep resistance.

EXAMPLE II: Increased Creep Resistance

Specimens were prepared as described for Example I except that the molar ratio of $MgO/SiO_2$ was 2.28. The compressive creep resistance is shown in FIG. 3, dashed curve II-a being for the unoxidized specimen and solid curve II-b being for the oxidized specimen. The creep strength of the oxidized specimen was considerably higher than the unoxidized specimen.

EXAMPLE III: Increased Creep Resistance

Specimens were prepared as described for Example I except that the mole fraction of $Si_3N_4$ was 0.83 and the molar ratio of $MgO/SiO_2$ was 2.40. The compressive creep resistance is shown in FIG. 3, dashed curve III-a being for the unoxidized specimen and solid curve III-b being for the oxidized specimen.

EXAMPLE IV: Increased Creep Resistance

To determine if the method applied to $Si_3N_4$ ceramics having a $Y_2O_3$ rather than MgO glass forming densification aid, specimens were cut from a ceramic of 0.85 mole fraction $Si_3N_4$, balance $Y_2O_3$ and $SiO_2$, with a molar ratio of $Y_2O_3/SiO_2$ of 0.5. Some of the specimens were oxidized in an air furnace at 1600° C. for 120 hours. The higher oxidation temperature was used because of the higher melting temperature of the $Y_2O_3$-containing glass as compared to the MgO-containing glass. The oxidized ceramic (curve IV-b) had a higher compressive creep strength than the unoxidized ceramic (curve IV-a) as shown in FIG. 3.

EXAMPLES V-XIX: Increased Strength

Standard flexural strength tests were run on specimens in the $Si_3N_4$-$SiO_2$-MgO system having the composition shown in Table I. The specimens were oxidized together in air at 1400° C. for 300 hours. After oxidation, each specimen was separately surface ground until surface pits (formed to various depths on the materials of different composition) were no longer observed by visual inspection with a binocular microscope. Previous work by one of the coinventors (F. F. Lange, "Reaction of Iron with $Si_3N_4$ Materials to Produce Surface Pitting", Journal of The American Ceramic Society, Vol. 61, No. 5-6, May-June, 1978) has shown that large pits form during the oxidation of many (but no all) $Si_3N_4$ ceramic compositions. These pits are responsible for the degradation in flexural strength previously reported for commercial $Si_3N_4$ ceramics fabricated with MgO and subjected to long term oxidation.

The flexural strength at 1400° C. is shown in Table I for an unoxidized specimen and for a specimen oxidized in an air furnace at 1400° C. for 300 hours. The oxidized specimens had a significant increase in flexural strength.

EXAMPLE XX: Increased Strength

Flexural test specimens were diamond cut from a large billet of $Si_3N_4$ obtained from the Norton Company and commercially identified as NC-132 hot-pressed $Si_3N_4$. Specimens were subjected to oxidation in air at 1400° C. for 548 hours and then surface ground to remove pits as described for Examples V-XIX. The average flexural strength of the oxidized specimens at a test temperature of 1400° C. was 54,500 psi. This compares to an average flexural strength (at 1400° C.) of only 40,900 psi for similarly prepared specimens which did not have the oxidation treatment.

EXAMPLE XXI: Increased Strength

To determine if a higher temperature oxidation treatment could

TABLE I

| EXAMPLE NO. | MOLE FRACTION OF $Si_3N_4$ | MOLAR RATIO OF $MgO/SiO_2$ | FLEXURAL STRENGTH UNOXIDIZED | OXIDIZED | INCREASE |
|---|---|---|---|---|---|
| V | 0.75 | 0.09 | 32,700 psi | 58,800 psi | 80% |
| VI | 0.75 | 0.32 | 37,700 | 66,000 | 75 |
| VII | 0.75 | 0.53 | 40,400 | 65,100 | 61 |
| VIII | 0.75 | 1.04 | 28,800 | 49,100 | 70 |
| IX | 0.75 | 2.28 | 27,000 | 73,900 | 174 |
| X | 0.83 | 0.97 | 41,600 | 65,600 | 58 |
| XI | 0.83 | 0.22 | 51,000 | 61,000 | 20 |
| XII | 0.83 | 0.54 | 48,500 | 65,500 | 35 |
| XIII | 0.83 | 1.06 | 30,600 | 54,600 | 78 |
| XIV | 0.83 | 0.29 | 42,000 | 50,700 | 21 |
| XV | 0.91 | 0.29 | 50,000 | 70,200 | 40 |
| XVI | 0.91 | 0.50 | 49,200 | 77,000 | 57 |
| XVII | 0.91 | 0.80 | 44,500 | 64,500 | 45 |
| XVIII | 0.91 | 1.57 | 27,000 | 47,400 | 76 |
| XIX | 0.91 | 2.60 | 39,000 | 72,400 | 86 | be used to reduce the treatment time, flexural test specimens from the NC-132 billet were prepared as described for Example XX except that the oxidation temperature was increased from 1400° C. to 1500° C. The average flexural strength (at 1400° C.) of specimens oxidized at 1500° C. for 206 hours was 69,900 psi. For specimens oxidized at 1500° C. for 306 hours it was 82,000 psi. These strengths compare to an average flexural strength (at 1400° C.) of only 40,900 psi for similarly prepared specimens which did not have the oxidation treatments. While the above treatments increased the high temperature strength of the specimens shown, these treatments neither increased nor decreased these same specimens' room temperature strength (i.e., their room temperature strength was within the normal scatter of untreated specimens).

The advantage obtained by the oxidation treatment as shown in the above examples can be utilized during the compounding and fabrication of the ceramic. In normal practice of preparing $Si_3N_4$ ceramics, the fabricator adds a densification aid in order to form a liquid phase during sintering and densifying. During cooling from fabrication some or all of the liquid solidifies as a glass. This glassy phase reduces the high temperature strength and oxidation resistance of the ceramic. Therefore, the fabricator must strike a compromise between the amount of densification aid added to improve sintering and the strength of the ceramic. The present invention greatly reduces this problem because it provides a means for drawing out some of the glassy phase after the ceramic is densified to improve its high temperature strength and oxidation resistance.

According to the invention, a sufficient quantity of densification aid is added to the $Si_3N_4$ powder to cause rapid densification due to the formation of a liquid, glassy phase during sintering. The mixture of powder is then sintered to form a dense $Si_3N_4$ ceramic. The ceramic is cooled and the glassy phase is drawn out by the oxidation treatment previously described.

The amount of grinding required after the oxidation treatment depends upon the depth of the pits formed during the oxidation treatment.

What is claimed is:

1. A post-fabrication method of increasing the high temperature strength of a dense, polyphase silicon nitride ($Si_3N_4$), structural ceramic, comprising the steps of:
    providing a densified $Si_3N_4$ ceramic having a glassy phase;
    providing silicon dioxide ($SiO_2$) on the surface of said $Si_3N_4$ ceramic;
    heating said $Si_3N_4$ ceramic and said $SiO_2$ at a temperature sufficient to cause diffusion of impurity and additive cations from said glassy phase into said $SiO_2$; and
    removing surface pits formed during said heating step.

2. The method as claimed in claim 1, wherein said step of providing $SiO_2$ comprises heating said $Si_3N_4$ ceramic in an oxidizing atmosphere, whereby an $SiO_2$ scale is formed on said $Si_3N_4$ ceramic by oxidation of said $Si_3N_4$ ceramic.

3. The method as claimed in claim 1, wherein said step of providing $SiO_2$ comprises packing said $Si_3N_4$ ceramic in $SiO_2$ powder.

4. The method as claimed in claim 1, wherein said $Si_3N_4$ ceramic comprises an Si-Mg-O-N ceramic and said cations comprise Mg and cations from impurities selected from the group consisting of Ca, Fe, Al, Mn, Na, and K.

5. The method as claimed in claim 1, wherein said $Si_3N_4$ ceramic having a glassy phase comprises an Si-Ce-O-N ceramic and said cations comprise Ce and cations from impurities selected from the group consisting of Mg, Ca, Fe, Al, Mn, Na and K.

6. The method as claimed in claim 1, wherein said $Si_3N_4$ ceramic having a glassy phase comprises an Si-Y-O-N ceramic and said cation comprise Y and cations from impurities selected from the group consisting of Mg, Ca, Fe, Al, Mn, Na and K impurities.

7. The method as claimed in claim 1, wherein said $Si_3N_4$ ceramic having a glassy phase comprises an Si-Al-O-N ceramic and said cation comprises Al and cations from impurities selected from the group consisting of Mg, Ca, Fe, Mn, Na, and K impurities.

8. A method of fabricating an improved silicon nitride ($Si_3N_4$), structural ceramic, comprising the steps of:
    providing a mixture of $Si_3N_4$ powder and a sufficient quantity of a densification aid to cause rapid densification due to the formation of a liquid glassy phase during sintering;
    sintering said mixture to form a dense $Si_3N_4$ ceramic;
    providing silicon dioxide ($SiO_2$) on the surface of said $Si_3N_4$ ceramic;
    heating said $Si_3N_4$ ceramic and said $SiO_2$ at a temperature sufficient to cause diffusion of impurities and additive cations from silicates in said glassy phase into said $SiO_2$; and
    grinding said $Si_3N_4$ ceramic to a depth sufficient to remove surface pits formed during said heating step.

9. The method as claimed in claim 8, wherein said densification aid comprises a glassy, phase-forming material containing $SiO_2$ and an element selected from the group consisting of Mg, Ce, Y, Nd, Be, Al, and La.

10. A method of increasing the high temperature strength of a densified, polyphase Si-Mg-O-N, structural ceramic, comprising the steps of:
    providing said Si-Mg-O-N ceramic;
    providing $SiO_2$ on the surface of said ceramic;
    heating said ceramic at a temperature sufficient to cause diffusion of Mg out of said ceramic and into said $SiO_2$; and
    grinding said Si-Mg-O-N ceramic to a depth sufficient to remove surface pits formed during said heating step.

11. A method of increasing the high temperature strength of a densified, polyphase Si-Ce-O-N, structural ceramic, comprising the steps of:
    providing said Si-Ce-O-N ceramic;
    providing $SiO_2$ on the surface of said ceramic;
    heating said ceramic at a temperature sufficient to cause diffusion of Ce out of said ceramic and into said $SiO_2$; and
    removing surface pits formed during said heating step.

12. A method of increasing the high temperature strength of a densified, polyphase Si-Y-O-N, structural ceramic, comprising the steps of:
    providing said Si-Y-O-N ceramic;
    providing $SiO_2$ on the surface of said ceramic;
    heating said ceramic at a temperature sufficient to cause diffusion of Y out of said ceramic and into said $SiO_2$; and
    removing surface pits formed during said heating step.

13. A method of increasing the high temperature strength of a densified, polyphase Si-Mg-O-N, structural ceramic, comprising the steps of:
    providing said Si-Mg-O-N ceramic;
    providing $SiO_2$ on the surface of said ceramic;
    heating said ceramic at a temperature of at least 1400° C. for at least 24 hours; and
    removing surface pits formed during said heating step.

14. A method of increasing the high temperature strength of a densified, polyphase Si-Y-O-N, structural ceramic, comprising the steps of:
    providing said Si-Y-O-N ceramic;
    providing $SiO_2$ on the surface of said ceramic;
    heating said ceramic at a temperature of at least 1600° C. for at least 24 hours; and
    removing surface pits formed during said heating step.

* * * * *